US012754290B2

(12) United States Patent
Oggier et al.

(10) Patent No.: US 12,754,290 B2
(45) Date of Patent: Oct. 6, 2026

(54) DEPTH SENSING USING MULTIPLE COHERENT EMITTERS

(71) Applicant: Apple Inc., Cupertino, CA (US)

(72) Inventors: Thierry Oggier, Zurich (CH); Ehsan Shah-Hosseini, San Francisco, CA (US); Edward Vail, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 663 days.

(21) Appl. No.: 18/113,104

(22) Filed: Feb. 23, 2023

(65) Prior Publication Data

US 2024/0288549 A1 Aug. 29, 2024

(51) Int. Cl.

*G01S 7/481* (2006.01)
*G01S 7/4913* (2020.01)
*G01S 17/34* (2020.01)

(52) U.S. Cl.

CPC .......... *G01S 7/4812* (2013.01); *G01S 7/4815* (2013.01); *G01S 7/4913* (2013.01); *G01S 17/34* (2020.01)

(58) Field of Classification Search

CPC .... G01S 7/4812; G01S 7/4815; G01S 7/4913; G01S 17/34; G01S 7/4813; G01S 7/4911; G01S 7/4917; G01S 7/497; G01S 7/499; G01S 17/58; G01S 17/89; G02B 5/04; G02B 27/283; G02B 6/29358;

(Continued)

(56) References Cited

U.S. PATENT DOCUMENTS 6,424,407 B1 7/2002 Kinrot et al.
9,122,015 B2 9/2015 Shimizu (Continued)

FOREIGN PATENT DOCUMENTS

CN 109541619 A 3/2019
CN 113866875 A 12/2021

(Continued)

OTHER PUBLICATIONS

Non-Final Office Action U.S. Appl. No. 17/863,419, dated Aug. 12, 2025.

(Continued)

*Primary Examiner* — Nathnael Aynalem
(74) *Attorney, Agent, or Firm* — Meitar Patents LTD.; Daniel Kligler

(57) ABSTRACT

Range sensing apparatus includes a transmitter including an array of emitters configured to emit respective beams of coherent optical radiation and switching circuitry coupled to the emitters. An optical assembly is configured to divide each beam of the coherent optical radiation into a transmitted beam and a local beam, to project the local beam toward an optical detector, to project the transmitted beam toward a respective location on a target, and to direct optical radiation reflected from the respective location onto the optical detector so as to interfere optically with the local beam. A controller is coupled to apply amplitude-chirped electrical drive pulses to the transmitter while controlling the switching circuitry to temporally multiplex the electrical drive pulses among the emitters, and to receive and process electrical beat signals output by the optical detector in response to interference between the reflected optical radiation and the local beam.

20 Claims, 8 Drawing Sheets

(58) Field of Classification Search
CPC ............ G01B 2290/45; G01B 2290/70; G01B 9/02018; G01B 9/02056; G01B 9/02081; H04B 10/25137
USPC .............................................................. 356/4
See application file for complete search history.

(56) References Cited

U.S. PATENT DOCUMENTS

| | | | |
|---|---|---|---|
| 9,529,079 | B1 | 12/2016 | Droz et al. |
| 9,971,948 | B1 | 5/2018 | Herrington et al. |
| 10,018,723 | B2 | 7/2018 | Sromin et al. |
| 10,416,385 | B1 | 9/2019 | Mikkelsen et al. |
| 10,883,874 | B2 | 1/2021 | Cho et al. |
| 10,908,267 | B1 | 2/2021 | Gagne et al. |
| 11,531,111 | B2 | 12/2022 | Rumala |
| 12,189,179 | B2 | 1/2025 | Huang et al. |
| 2005/0275826 | A1 | 12/2005 | Ohtomo et al. |
| 2006/0227316 | A1 | 10/2006 | Gatt |
| 2009/0216093 | A1 | 8/2009 | Sebastian et al. |
| 2010/0265504 | A1 | 10/2010 | Kopp et al. |
| 2013/0206963 | A1 | 8/2013 | Grund |
| 2013/0208258 | A1 | 8/2013 | Eisele et al. |
| 2017/0172510 | A1 | 6/2017 | Homyk et al. |
| 2017/0179680 | A1 | 6/2017 | Mahgerefteh et al. |
| 2017/0285325 | A1 | 10/2017 | Erlich et al. |
| 2017/0299698 | A1 | 10/2017 | Yagi et al. |
| 2017/0322015 | A1 | 11/2017 | Knüttel |
| 2019/0025426 | A1 | 1/2019 | Satyan et al. |
| 2019/0036308 | A1 | 1/2019 | Carson et al. |
| 2019/0170938 | A1 | 6/2019 | Plantier et al. |
| 2019/0331771 | A1 | 10/2019 | Iguchi |
| 2020/0234785 | A1 | 7/2020 | Kyselov et al. |
| 2020/0257128 | A1 | 8/2020 | Sakai et al. |
| 2020/0341200 | A1 | 10/2020 | Van Vaerenbergh |
| 2020/0371212 | A1 | 11/2020 | Rumala |
| 2021/0031119 | A1 | 2/2021 | Clements |
| 2021/0055390 | A1* | 2/2021 | LaChapelle ........... G01S 7/4865 |
| 2021/0109197 | A1 | 4/2021 | O'Keeffe |
| 2021/0165083 | A1 | 6/2021 | Fine et al. |
| 2021/0257396 | A1 | 8/2021 | Piggott et al. |
| 2021/0314734 | A1 | 10/2021 | Mehta et al. |
| 2021/0341611 | A1 | 11/2021 | Boloorian |
| 2021/0373350 | A1 | 12/2021 | Oda et al. |
| 2021/0382153 | A1 | 12/2021 | Dielacher et al. |
| 2021/0405164 | A1 | 12/2021 | Klemme et al. |
| 2022/0026574 | A1 | 1/2022 | Vaello Cloths et al. |
| 2022/0043108 | A1 | 2/2022 | Lavian |
| 2022/0050201 | A1 | 2/2022 | Sun et al. |
| 2022/0075076 | A1 | 3/2022 | Michaels et al. |
| 2022/0091242 | A1 | 3/2022 | Gagne et al. |
| 2022/0113379 | A1 | 4/2022 | Viswanatha et al. |
| 2022/0137226 | A1 | 5/2022 | Kim et al. |
| 2022/0187457 | A1 | 6/2022 | Daami et al. |
| 2022/0187471 | A1 | 6/2022 | Eshel et al. |
| 2022/0404475 | A1 | 12/2022 | Aflaquiere et al. |
| 2023/0048766 | A1 | 2/2023 | Frey |
| 2023/0350033 | A1 | 11/2023 | Halbritter |
| 2023/0358891 | A1 | 11/2023 | Carr et al. |
| 2023/0393241 | A1 | 12/2023 | Barragan et al. |
| 2024/0069285 | A1 | 2/2024 | Hajati et al. |
| 2024/0094357 | A1* | 3/2024 | Smith ................... G01S 7/4876 |
| 2024/0288552 | A1 | 8/2024 | Milgrome et al. |
| 2024/0369689 | A1 | 11/2024 | Hajati et al. |
| 2025/0094380 | A1 | 3/2025 | Mazed |
| 2025/0116763 | A1 | 4/2025 | Spollard et al. |

FOREIGN PATENT DOCUMENTS

| | | | |
|---|---|---|---|
| CN | 115605774 | A | 1/2023 |
| CN | 115932888 | A | 4/2023 |
| DE | 102020213161 | A1 | 4/2022 |
| EP | 3961257 | A1 | 3/2022 |
| EP | 3971614 | A1 | 3/2022 |
| ES | 2896302 | T3 | 2/2022 |
| JP | 2022161879 | A | 10/2022 |
| JP | 2025537142 | A | 11/2025 |
| KR | 1020230070298 | A | 5/2023 |
| WO | 2015098288 | A1 | 7/2015 |
| WO | 2018102190 | A1 | 6/2018 |
| WO | 2019036383 | A1 | 2/2019 |
| WO | 2020161260 | A1 | 8/2020 |
| WO | 2020190338 | A1 | 9/2020 |
| WO | 2022168500 | A1 | 8/2022 |
| WO | 2023012527 | A1 | 2/2023 |
| WO | 2023032975 | A1 | 3/2023 |
| WO | 2024103074 | A1 | 5/2024 |

OTHER PUBLICATIONS

Wang, "Investigation of New Concepts and Solutions for Silicon Nanophotonics," Doctoral Thesis in Microelectronics and Applied Physics, Stockholm, Sweden, pp. 1-91, year 2010.
Sacher et al., "Wide Bandwidth and High Coupling Efficiency Si3N4-on-SOI Dual-level Grating Coupler," Optics Express, vol. 22, No. 9, pp. 1-10, May 5, 2014.
Rogers et al., "A Universal 3D Imaging Sensor on a Silicon Photonics Platform," ArXiv:2008.02411v3, pp. 1-18, Nov. 11, 2020.
Lumerical Inc., "Tutorial—Splitter Optimization," pp. 1-8, year 2019, as downloaded from https://lumopt.readthedocs.io/en/latest/tutorial.html.
Nicolaescu et al., "3D Imaging via Silicon-photonics-based LIDAR," Proc. SPIE vol. 11691, Silicon Photonics XVI, pp. 1-12, year 2021.
Marchetti et al., "Coupling Strategies for Silicon Photonics Integrated Chips [Invited]," Photonics Reseach, vol. 7, No. 2, pp. 1-39, Feb. 2019.
Marchetti et al., "High-efficiency Grating-couplers: Demonstration of a New Design Strategy," Springer Nature, Scientific Reports, vol. 7, pp. 1-9, Nov. 2017.
Hooten et al., "Inverse Design of Grating Couplers Using the Policy Gradient Method from Reinforcement Learning," De Gruyter, Nanophotonics, vol. 10, issue 15, pp. 3843-3856, year 2021.
Michaels, "A Hierarchical Approach to the Design and Optimization of Photonics," PHD Thesis, University of California, Berkeley, pp. 1-139, year 2019.
Molesky, "Outlook for Inverse Design in Nanophotonics," arXiv:1801.06715v1, pp. 1-13, Jan. 20, 2018.
International Application # PCT/US2023/066803 Search Report dated Jul. 27, 2023.
Islam et al., U.S. Appl. No. 18/357,181, filed Jul. 24, 2023.
Kamali et al., "A review of dielectric optical metasurfaces for wavefront control," Nanophotonics, Open Access, pp. 1-84, May 18, 2018.
Xiong et al., "Controlling the degrees of freedom in metasurface designs for multi-functional optical devices," Nanoscale Advances, vol. 1, pp. 3786-3806, year 2019.
Wikipedia, "Laser speckle contrast imaging," pp. 1-8, last edited Dec. 12, 2023.
Li et al., "Transmissive-detected laser speckle contrast imaging for blood flow monitoring in thick tissue: ," from Monte Carlo simulation to experimental demonstration, Nature, Light: Science & Applications, vol. 10, article No. 241, pp. 1-43, Dec. 3, 2021.
Heeman et al., "Clinical applications of laser speckle contrast imaging: a review," Journal of Biomedical Optics, vol. 24, No. 8, pp. 080901-1-80901-11, Aug. 2019.
Zalevsky et al., "Simultaneous remote extraction of multiple speech sources and heart beats from secondary speckles pattern," Optics Express, vol. 17, No. 24, pp. 1-15, Nov. 23, 2009.
Ding et al., "Compensation of Laser Frequency Tuning Nonlinearity of a Long Range OFDR Using Deskew Filter," Optics Express, vol. 21, No. 3, pp. 3826-3834, Feb. 11, 2013.
Du et al., "Method for Improving Spatial Resolution and Amplitude by Optimized Deskew Filter in Long-Range OFDR," IEEE Photonics Journal, vol. 6, No. 5, pp. 1-13, Oct. 2014.
Sandborn, "FMCW Lidar: Scaling to the Chip-Level and Improving Phase-Noise-Limited Performance," Dissertation, Electrical Engineering and Computer Sciences, University of California at Berkeley, USA, pp. 1-90, Dec. 1, 2019.

(56) References Cited

OTHER PUBLICATIONS

Meta et al., “Signal Processing for FMCW SAR,” IEEE Transactions on Geoscience and Remote Sensing, voume 45, No. 11, pp. 3519-3532, Nov. 2007.
Peek, “Estimation and Compensation of Frequency Sweep Nonlinearity in FMCW Radar,” M.Sc. thesis in Applied Mathematics, The University of Twente, The Netherlands, pp. 1-67, Sep. 2011.
Meta et al., “Range Non-Linearities Correction in FMCW SAR,” IEEE, pp. 403-406, year 2006.
Baumann et al., “Speckle Phase Noise in Coherent Laser Ranging: Fundamental Precision Limitations,” Optics Letters, vol. 39, issue 16, pp. 4776-4779, Aug. 15, 2014.
Islam et al., U.S. Appl. No. 17/577,039, filed Jan. 17, 2022.
Islam et al., U.S. Appl. No. 17/742,419, filed May 12, 2022.
Cohen, U.S. Appl. No. 17/838,217, filed Jun. 12, 2022.
Islam et al., U.S. Appl. No. 17/863,419, filed Jul. 13, 2022.
Northcott et al., U.S. Appl. No. 18/094,999, filed Jan. 10, 2023.
Kendrisic et al., “Thermally Tuned VCSEL-Based SS-OCT System,” Biophotonics Congress: Biomedical Optics (Translational, Microscopy, OCT, OTS, BRAIN), Optica Publishing Group, pp. 1-2, year 2022.
Axelrod et al., “Reconfigurabe Quasi-Resonance Scanner for 3D FMCW Imaging,” Optics Letters, vol. 39, issue 16, pp. 4776-4779, year 2014.
Shnaiderman et al., U.S. Appl. No. 18/094,997, filed Jan. 10, 2023.
Shnaiderman et al., U.S. Appl. No. 18/314,843, filed May 10, 2023.
Vasilyev, “The Optoelectronic Swept-Frequency Laser and Its Applications in Ranging, Three-Dimensional Imaging, and Coherent Beam Combining of Chirped-Seed Amplifiers,” Doctoral Thesis, California Institute of Technology, pp. 1-177, year 2013.
International Application # PCT/US2023/084979 Search Report dated Mar. 12, 2024.
Huang, Frequency-modulated continuous-wave 3D imaging with high photon efficiency Huang, Jul. 12, 2022, vol. 47, pp. 3568-3571.
Japanese Office Action, Application # 2024-115446, dated Jun. 2, 2025.
Japanese Office Action, Application # 2024-115446, dated Oct. 14, 2025.
Non Final Office Action, U.S. Appl. No. 17/838,217, dated Jul. 30, 2025.
Ma et al, “Self-Supervised Sparse-to-Dense: Self-Supervised Depth Completion from LiDAR and Monocular Camera”, 2019 International Conference on Robotics and Automation(ICRA), Aug. 12, 2019, pp. 1-12.
Non-Final Office Action. U.S. Appl. No. 17/742,419, dated Jun. 6, 2025.
Second Office Action (CNIPA) for Application # 202180031211.X, dated Jun. 7, 2025.
English Translation for CN-113866875-A, 12 pages (Year: 2021).
Notice of Preliminary Rejection, Korean Application No. 10-2024-0094904, May 21, 2026.
Notice of References Cited, U.S. Appl. No. 18/623,080, dated Jun. 17, 2026.
Office Action, U.S. Appl. No. 18/623,080, dated Jun. 17, 2026.

* cited by examiner

DEPTH SENSING USING MULTIPLE COHERENT EMITTERS

FIELD OF THE INVENTION

The present invention relates generally to systems and methods for depth sensing, and particularly to frequency-modulated continuous-wave LiDAR.

BACKGROUND

In certain depth sensing arrangements, a radio-frequency (RF) chirp is applied to modulate the frequency of the beam of light (typically a single-mode laser beam) that is directed towards a target. The light reflected from the target is mixed with a sample of the transmitted light (referred to as the local beam or local oscillator) and detected by a photodetector, such as a balanced photodiode pair. The photodetector outputs an RF signal at a beat frequency that is proportional to the distance to the target.

When the target is moving, the resulting Doppler shift of the reflected light will cause the beat frequency to increase or decrease, depending on the direction of motion. By comparing the beat frequencies obtained from chirps of positive and negative slopes, it is thus s possible to extract both the range and the velocity of the target. In the ideal case, if the beat frequency due to the Doppler shift is d, and the beat frequency due to the chirp and range is r, then the measured beat frequency for the up-chirp will be $f_u$=d+r, and the beat frequency on the down-chirp will be $f_d$=d−r. Thus, the sum of the measured up and down chirp frequencies reveals the Doppler shift, and the difference the range.

SUMMARY

Embodiments of the present invention that are described hereinbelow provide improved methods and devices for depth sensing.

There is therefore provided, in accordance with an embodiment of the invention, range sensing apparatus, which includes a transmitter, including an array of emitters configured to emit respective beams of coherent optical radiation and switching circuitry coupled to the emitters, and an optical detector. An optical assembly is configured to divide each beam of the coherent optical radiation into a transmitted beam and a local beam, to project the local beam toward the optical detector, to project the transmitted beam toward a respective location on a target, and to direct optical radiation reflected from the respective location onto the optical detector so as to interfere optically with the local beam. A controller is coupled to apply amplitude-chirped electrical drive pulses to the transmitter while controlling the switching circuitry to temporally multiplex the electrical drive pulses among the emitters, and to receive and process electrical beat signals output by the optical detector in response to interference between the reflected optical radiation and the local beam.

In a disclosed embodiment, the array of emitters and the switching circuitry are disposed on a single integrated circuit. Additionally or alternatively, the apparatus includes an array of lenslets disposed on the array of emitters, wherein each lenslet is aligned with a respective emitter. Further additionally or alternatively, the emitters include vertical-cavity surface-emitting lasers (VCSELs).

In one embodiment, the apparatus includes an digital-analog converter configured to generate the electrical drive pulses in response to a digital input from the controller, and the controller is configured to vary the digital input during each of the drive pulses so as to linearize a frequency chirp of the beams of optical radiation.

In a disclosed embodiment, the optical detector includes a balanced pair of photodiodes.

In some embodiments, the optical detector includes a single detector, and the optical assembly is configured to direct the optical radiation reflected from the respective beams of all the emitters in the array onto the single detector. Alternatively, the optical detector includes an array of detectors.

In a disclosed embodiment, the controller is configured to analyze the beat signals to find a range of the respective location on the target.

In some embodiments, the optical assembly includes a polarizing beamsplitter cube, which is configured to divide each beam of the coherent optical radiation into the transmitted beam and the local beam, and one or more polarization rotators. In one embodiment, the polarizing beamsplitter cube includes an X-cube.

Additionally or alternatively, the optical assembly includes a monolithic assembly of prisms. In one embodiment, the optical detector includes first and second photodiodes positioned on different, first and second sides of the monolithic assembly of prisms and configured to receive respective first and second parts of the reflected optical radiation and of the local beam.

In an alternative embodiment, the optical assembly includes an optical waveguide including input and output couplers, wherein the transmitted beam and the reflected radiation pass through the waveguide to and from the target, while the local beam is guided within the waveguide between the input and output couplers from the transmitter to the optical detector.

In one embodiment, the emitters are interleaved with the optical detector on a common substrate. Additionally or alternatively, the emitters are disposed over the optical detector.

There is also provided, in accordance with an embodiment of the invention, a method for range sensing, which includes providing a transmitter including an array of emitters configured to emit respective beams of coherent optical radiation. Amplitude-chirped electrical drive pulses are applied to the transmitter while temporally multiplexing the electrical drive pulses among the emitters so that the emit emitters the respective beams sequentially. Each beam of the coherent optical radiation is divided into a transmitted beam and a local beam. The local beam is projected toward an optical detector, while projecting the transmitted beam toward a respective location on a target. Optical radiation reflected from the respective location is directed onto the optical detector so as to interfere optically with the local beam. Electrical beat signals output by the optical detector are received and processed in response to interference between the reflected optical radiation and the local beam.

The present invention will be more fully understood from the following detailed description of the embodiments thereof, taken together with the drawings in which:

DETAILED DESCRIPTION OF EMBODIMENTS

Overview

Figure 1:
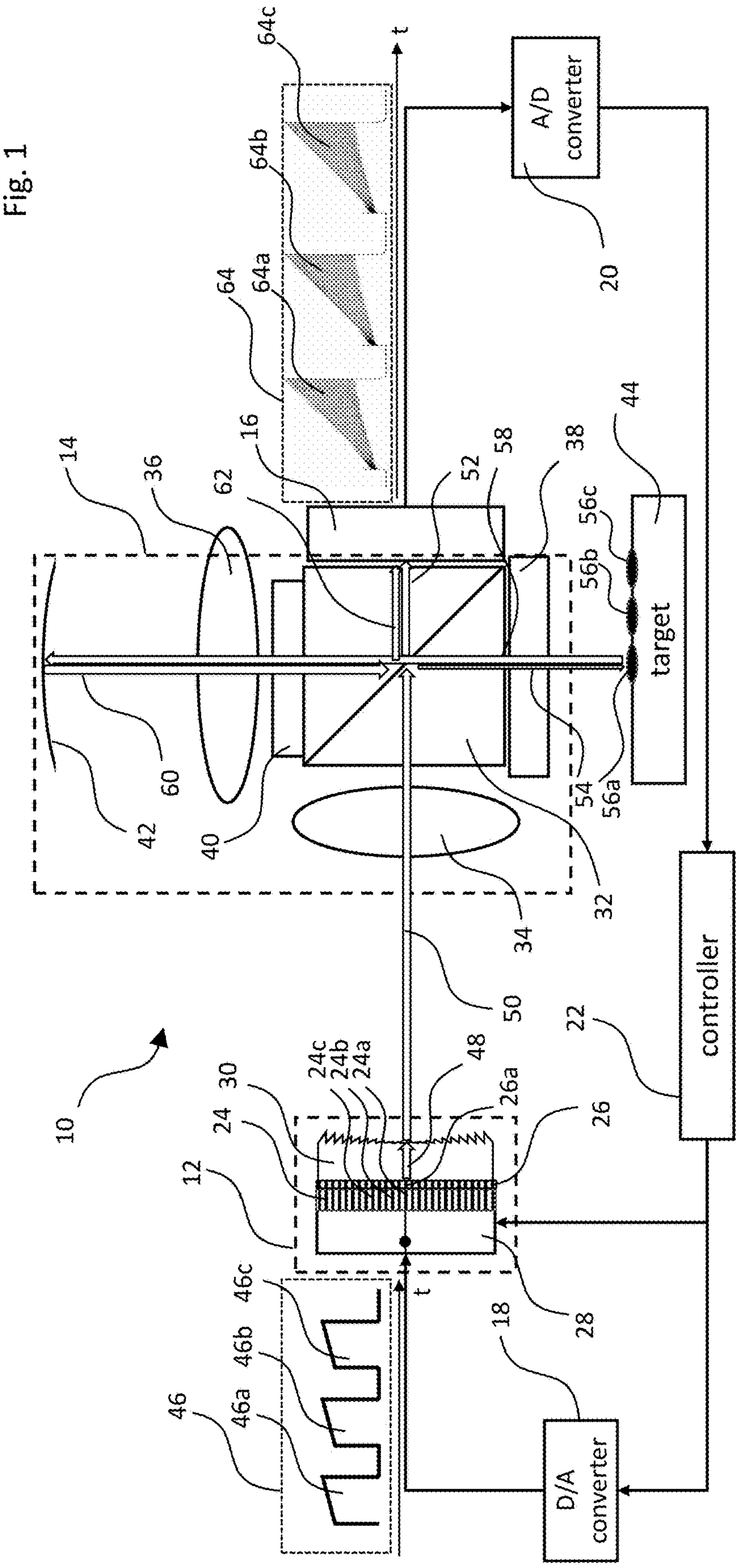
FIG. 1 is a schematic sectional view of a range sensing apparatus, in accordance with an embodiment of the invention.

Frequency-modulated continuous-wave (FMCW) depth sensors are commonly used to map the topography of a target. Such depth sensors comprise either a scanner, which scans a beam from one or more emitters of optical radiation across the target, or an array of emitters, whose individual beams are projected onto the target. Scanners are costly in terms of power consumption and size, and they are sensitive to shock and vibration. When an array of emitters is used, each emitter typically requires its own drive circuit for driving the emitter. The radiation reflected from the target is commonly detected by an array of optical detectors with an analog-to-digital (A/D) converter for each detector. The emission frequency of each emitter is modulated by external modulation circuitry. Although various arrangements for FMCW depth sensors are presently in use, their complexity and size reduce their utility for mobile use cases.

To address these problems in the embodiments of the present invention that are described herein, a range sensing apparatus comprises an array of emitters and fewer photodetectors than emitters, typically a single photodetector or a balanced photodetector pair. The driving circuitry is temporally multiplexed to drive the emitters of an emitter array, with the drive signal being sequentially switched from emitter to emitter by switching circuitry. The driving and switching circuitry can be integrated together with the emitter array on a single chip, thus reducing packaging cost and electromagnetic interference. Similarly, the detection circuitry is simplified to a single A/D converter coupled to the single photodetector (or alternatively to two A/D converters coupled to a balanced pair).

In some embodiments, rather than having separate frequency-modulating circuitry coupled to each of the emitters, the inherent Joule-heating of each emitter due to the excitation current is utilized: Amplitude-chirped electrical drive pulses are applied to the emitters, i.e., the instantaneous drive voltage is ramped up over the duration of each excitation pulse. The chirped electrical pulses cause a temperature rise during each pulse, which shifts the emission wavelength, thus causing a chirp in the emission frequency.

In the disclosed embodiments, a range sensing apparatus comprises a transmitter, which comprises an array of emitters, emitting respective beams of coherent radiation, and switching circuitry coupled to the emitters. The apparatus further comprises an optical detector, an optical assembly, and a controller. The optical assembly divides each beam of the coherent optical radiation into a transmitted beam and a local beam, projects the local beam toward the optical detector, and projects the transmitted beams toward respective locations on a target. The respective beam from each emitter impinges on a different, respective location. The optical assembly further directs optical radiation reflected from the locations on the target onto the optical detector so as to interfere optically with the local beam.

The controller applies amplitude-chirped electrical drive pulses to the transmitter while controlling the switching circuitry to apply temporally multiplexed electrical drive pulses among the emitters, so that the emitters fire sequentially. The controller further receives and processes electrical beat signals output by the optical detector in response to interference between the reflected optical radiation and the local beam, and is thus able to compute the range and velocity for all the locations on the target on which the transmitted beams are incident.

SYSTEM DESCRIPTION

FIG. 1 is a schematic sectional view of a range sensing apparatus 10, in accordance with an embodiment of the invention. Apparatus 10 comprises a transmitter 12, an optical assembly 14, an optical detector 16, a digital/analog (D/A) converter 18, an analog/digital (A/D) converter 20, and a controller 22. Transmitter 12 comprises a two-dimensional VCSEL (vertical-cavity surface-emitting laser) array 24, a lenslet array 26 with each lenslet aligned with a respective VCSEL of the VCSEL array, switching circuitry 28, and a lens 30. Optical assembly 14 comprises a polarizing beamsplitter 32, lenses 34 and 36, one or more polarization rotators, such as quarter-wave plates 38 and 40, and a mirror 42. Controller 22 typically comprises a microprocessor or microcontroller, which has suitable interfaces for communicating with the other elements of system 10 and which is programmed in software and/or firmware to carry out the functions that are described herein. Additionally or alternatively, at least some of the functions of controller 22 may be carried out by suitable hard-wired or programmable logic circuits and may be integrated together with D/A converter 18 and/or transmitter 12.

In order to map the topography of a target 44, i.e., to find the range and possibly the velocity of various points on the target, controller 22 sends to D/A converter 18 a series of digital signals, which the D/A converter converts to a pulse train 46 of analog drive pulses. In one embodiment, each pulse in train 46 has a duration of 10 μs and an average current of 3 mA, but alternatively, other pulse characteristics may be applied. As illustrated in FIG. 1, the amplitude of each pulse ramps up over the duration of the pulse, typically by ramping up the digital signal and thus ramping up the drive current of the pulse. This ramped variation in the pulse amplitude is referred to herein as an amplitude chirp. The amplitude-chirped analog drive pulses in train 46 produce, through Joule-heating of the individual VCSELs, frequency-chirped optical signals.

Simultaneously, while sending amplitude-chirped electrical drive pulses in pulse train 46 to VCSEL array 24, controller 22 drives switching circuitry 28 to temporally multiplex the drive signals, so as to direct each analog pulse sequentially to a different VCSEL in array 24. Thus, each of the emitters in VCSEL array 24 emits a beam of coherent radiation in a sequence determined by controller 22, while using only a single D/A converter to drive the VCSELs of the array.

As an example, a VCSEL **24*a* in array 24 emits a beam 48 in response to a pulse 46*a* in pulse train 46. Beam 48 is collimated by a lenslet 26*a* of lenslet array 26 and directed as a beam 50 by lens 30 toward lens 34 and polarizing beamsplitter 32 of optical assembly 14. (The beams are depicted as simple arrows, without consideration for their divergence or power.) A portion of beam 50 is transmitted through polarizing beamsplitter 32, forming a local beam 52. The intensity of local beam 52 is typically 10% of that of beam 50, determined either by the polarization of beam 50 or by the coating of beamsplitter 32, but stronger or weaker local beams may alternatively be used. Local beam 52 impinges on optical detector 16**.

The major part of beam 50 is reflected by polarizing beamsplitter 32 and projected as a beam 54 to a location **56*a*** on target 44. The radiation reflected from location 56*a* returns as a beam 58 toward beamsplitter 32. Due to a double-pass through quarter-wave plate 38 with a concomitant rotation of its polarization by 90°, beam 58 now passes through beamsplitter 32 and is projected to mirror 42. After a further reflection from mirror 42 to a beam 60, and due to a double pass through quarter-wave plate 40, beam 60 is reflected by beamsplitter 32 as a beam 62 toward optical detector 16.

At optical detector 16, local beam 52 and beam 62, which has arrived from location 56*a* on target 44, interfere optically producing as an output from optical detector 16 a beat signal 64*a* in a signal train 64. Beat signal 64*a* is converted by A/D converter 20 into a digital signal and forwarded to controller 22, which analyzes the signal to find the range of location 56*a* on target 44 and, if so desired, the velocity of the target. Pulse 46*a* may be repeated to improve the signal-to-noise ratio of the measurement of the range of location 56*a* on target.

Pulses 46*b* and 46*c* in pulse train 46 are directed by switching circuitry 28 to different respective VCSELs 24*b* and 24*c* in VCSEL array 24. Due to the lateral offsets of VCSELs 24*a*-24*c*, each VCSEL illuminates a different location on target 44. For example, VCSELs 24*b* and 24*c* illuminate respective locations 56*b* and 56*c*, which are offset from each other and from location 56*a*. The radiation reflected from locations 56*b* and 56*c* produces, similarly to the radiation reflected from location 56*a*, respective beat signals 64*b* and 64*c*. These signals are used, similarly to signal 64*a*, by controller 22 to find the range of locations 56*b* and 56*c*. By energizing the VCSELs in VCSEL array 24 sequentially in this matter, the topography across target 44 may be mapped using a single photodetector 16. The resources of D/A converter 18, detector 16, and A/D converter 20 are thus temporally multiplexed among the VCSELS.

The temporal spacing of the peaks in the beat signals, i.e., the frequency of the beat signal, is determined by the rate of the Joule-heating in the VCSELs of VCSEL array 24 and the range to the target. The amplitude-chirped electrical drive pulses in pulse train 46 may be tailored so as to produce a constant Joule-heating, and consequently evenly-spaced peaks in the beat signals, i.e., to linearize the frequency chirp of the beat signal. This, in turn, will improve the accuracy in finding the range of target 44. The inventors have found that a linear ramp of the pulses, combined with a small amount of curvature added to the shape of the ramp, produces evenly-spaced peaks in the beat signals, i.e., a constant frequency of the signals.

Figure 2:
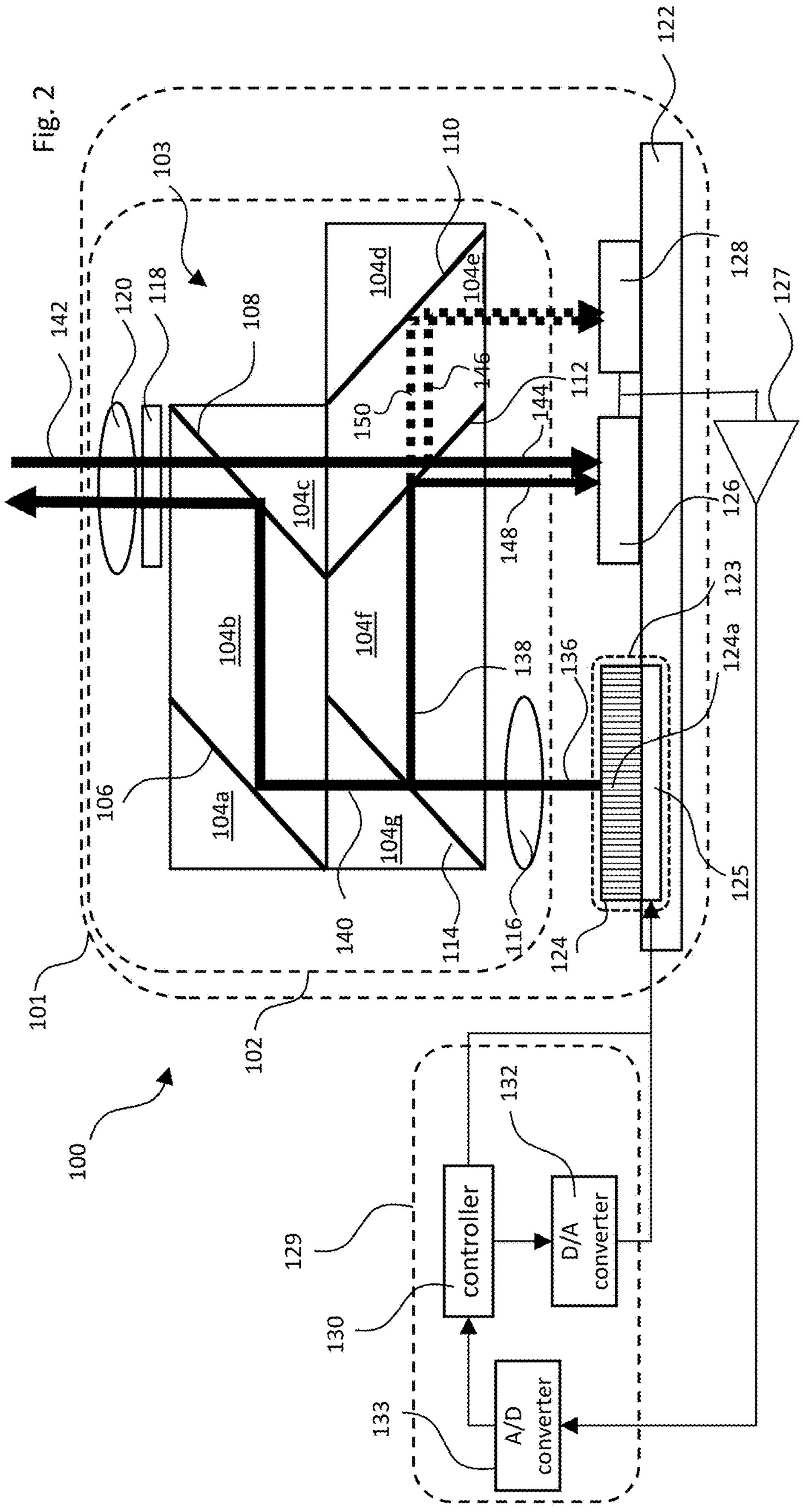
FIGS. 2-8 are schematic sectional views of range sensing apparatuses, in accordance with other embodiments of the invention.

FIG. 2 is a schematic sectional view of a range sensing apparatus 100, in accordance with another embodiment of the invention. This apparatus includes a larger number of prisms than apparatus 10 but reduces optical power losses and obviates the need for mirror 42.

Apparatus 100 comprises an optoelectronic assembly 101 and an electronic assembly 129. Optoelectronic assembly 101 comprises an optical assembly 102, comprising a monolithic prism assembly 103, which comprises prisms 104*a*, 104*b*, 104*c*, 104*d*, 104*e*, 104*f*, and 104*g*. (A monolithic prism assembly is an assembly of prisms that are cemented to each other.) Between the prisms are disposed beamsplitters and reflectors as follows:

A reflector 106, with 100% reflectance for all polarizations, is disposed between prisms 104*a* and 104*b;* a polarizing beamsplitter 108, with 100% reflectance for TE polarized radiation and 100% transmittance for TM polarized radiation, is disposed between prisms 104*b* and 104*c;* a reflector 110, with 100% reflectance for all polarizations, is disposed between prisms 104*d* and 104*e;* a beamsplitter 112, with 50% reflectance and transmittance for all polarizations, is disposed between prisms 104*e* and 104*f*; and a polarizing beamsplitter 114, with 100% transmittance for TE polarized radiation and 100% reflectance for TM polarized radiation, is disposed between prisms 104*f* and 104*g*.

Optical assembly 102 further comprises a collimating lens 116, a quarter-wave plate 118, and a projection lens 120.

Optoelectronic assembly 101 also comprises a silicon substrate 122, on which are disposed a transmitter 123, comprising a two-dimensional VCSEL array 124 and switching circuitry 125, and photodiodes 126 and 128. The photodiodes in this example are configured as a balanced pair, stacked anode-to-cathode and outputting a difference signal to a transimpedance amplifier 127. Components of electronic assembly 129 may also be integrated into silicon substrate 122 as integrated circuits, as further detailed hereinbelow. The VCSELs in VCSEL array 124 are oriented so that each emitted beam of radiation has 90% of its power in a TE orientation and 10% in TM orientation. VCSEL array 124 may also comprise a lenslet array (not shown), similar to lenslet array 26 in FIG. 1, for modifying the angular extent of the beams emitted by the individual VCSELs of the array. Similar lenslet arrays may be added to the VCSEL arrays described in the figures hereinbelow.

Electronic assembly 129 comprises a controller 130, a D/A converter 132, and an A/D converter 133 coupled to digitize the signal output by transimpedance amplifier 127. These components of electronic assembly 129 may be either discrete assemblies or parts of a single integrated circuit in silicon substrate 122. Controller 130 is coupled to D/A converter 132, to A/D converter 133, and to switching circuit 125. D/A converter 132 is coupled to switching circuit 125 as well.

For finding the range of a location on a target (not shown in this figure), controller 130, together with D/A converter 132 and switching circuitry 125 (similarly to controller 22, together with D/A converter 18, and switching circuitry 28 in FIG. 1), sends a current pulse sequentially to each of the VCSELs of VCSEL array 124, causing the VCSELs to emit sequentially beams of coherent optical radiation. As an example, a VCSEL 124*a* in VCSEL array 124 emits a beam 136, which is collimated by collimating lens 116 projected polarizing beamsplitter 114. Due to the orientation of the VCSELS, beam 136 splits at polarizing beamsplitter 114 into a local beam 138 with TM polarization, comprising 10% of the power of beam 136, and a beam 140 with TE polarization, comprising 90% of the power of beam 136.

Beam 140 is reflected by reflector 106 and polarizing beamsplitter 108 into quarter-wave plate 118 and is further projected by projection lens 120 toward the location on the target. The radiation reflected by the target returns to apparatus 100 as a beam 142 traversing projection lens 120 and quarter-wave plate 118. The double-pass through quarter-wave plate 118 (first as beam 140 and then as beam 142) rotates the polarization by 90°, and beam 142 passes through polarizing beamsplitter 108 and is split into two equally-powered beams 144 and 146 by beamsplitter 112. Beams 144 and 146 impinge, after beam 146 has been reflected by reflector 110, on respective photodiodes 126 and 128.

Local beam 138 is split into two equal-powered beams 148 and 150 by beamsplitter 112, with the two beams impinging, after beam 150 has been reflected by reflector 110, on respective photodiodes 126 and 128.

The beam-pair 144 and 148 and the beam-pair 146 and 150 interfere optically on respective photodiodes 126 and 128, with each photodiode emitting an analog electrical beat signal responsively to the optical interference signal. The electrical signals are converted by A/D converter 133 to digital signals, and processed by controller 130 to find the range of the location on the target where beam 140 impinged.

Electronic assembly 129 is used in FIGS. 3-8 hereinbelow in a similar fashion, both for driving the VCSELs in a VCSEL array and for receiving and processing analog signals from a single photodiode or from a balanced pair.

Figure 3:
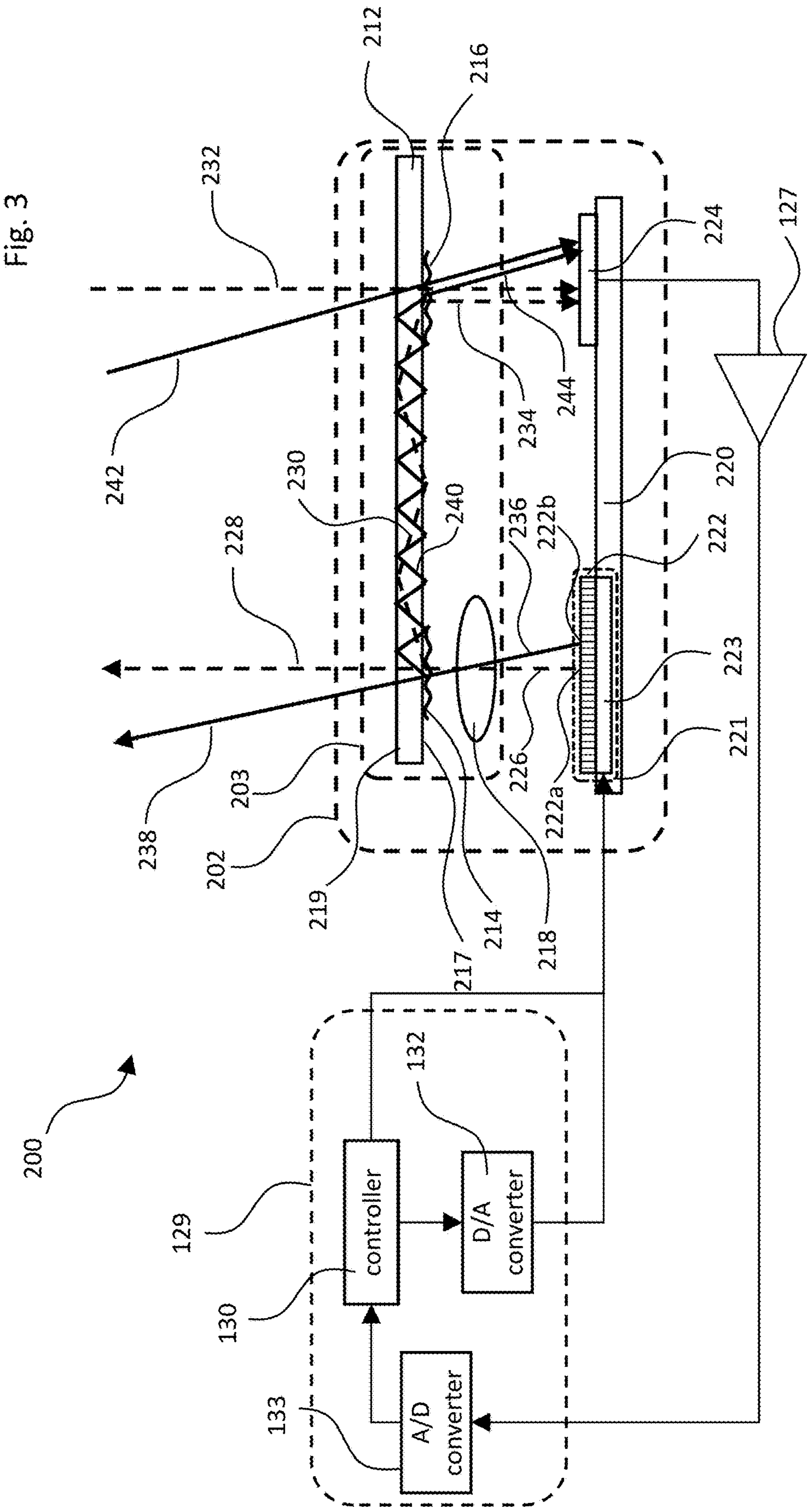

FIG. 3 is a schematic sectional view of a range sensing apparatus 200, in accordance with another embodiment of the invention.

Apparatus 200 comprises an optoelectronic assembly 202 and electronic assembly 129. Optoelectronic assembly 202 comprises an optical assembly 203, which comprises a planar optical waveguide 212, with an input coupler 214 and an output coupler 216 disposed on a lower surface 217 of the waveguide, for example as surface-relief gratings or volume phase gratings, and a collimating lens 218. Alternatively, input and output couplers 214 and 216, respectively, may be disposed on an upper surface 219 of waveguide 212. Further alternatively, input and output couplers 214 and 216 may comprise other sorts of couplers, such as refractive-index modulation couplers.

Optoelectronic assembly 202 further comprises a silicon substrate 220, on which a transmitter 221, comprising a two-dimensional VCSEL array 222 and switching circuitry 223, and a photodiode 224 are disposed. VCSEL array 222 may also comprise a lenslet array (not shown), similar to lenslet array 26 in FIG. 1, for modifying the angular extent of the beams emitted by the individual VCSELs of the array.

Electronic assembly 129, comprising sub-assemblies described in reference to FIG. 2 hereinabove, is coupled to switching circuitry 223 and to photodiode 224.

For finding the range of a location on a target (not shown in this figure), electronic assembly 129 drives the VCSELs of VCSEL array 222 to emit sequentially beams of coherent optical radiation. As an example, a VCSEL 222*a*, centered with collimating lens 218, emits a beam 226, which is collimated by the collimating lens and projected to input coupler 214. Input coupler 214 splits the beam into a beam 228, which exits waveguide 212 as a continuation of beam 226, and into a local beam 230, which propagates within the waveguide as a guided beam that is reflected by waveguide surfaces 217 and 219 by and total internal reflections.

Beam 228 impinges on the target at a given location. Radiation reflected by the target returns to apparatus 200 as a beam 232, which is transmitted through waveguide 212 and output coupler 216, impinging on photodiode 224. Local beam 230, propagating within waveguide 212, is coupled out of the waveguide by output coupler 216 as a beam 234, which propagates collinearly and overlapping with beam 232 onto photodiode 224. Beams 232 and 234 interfere optically, with the photodiode emitting an analog electrical beat signal responsively to the optical interference signal. The electrical signal is coupled via amplifier 127 into electronic assembly 129, wherein controller 130 finds the range of the location on the target where beam 228 impinged.

For finding the range of another location on the target, a different VCSEL, for example a VCSEL 222*b*, is driven by electronic assembly 129 to emit a beam 236. Similarly to beam 226 hereinabove, beam 236 is collimated and split into a beam 238 that is projected onto the target (to a different location from beam 228) and a local beam 240 that propagates in waveguide 212. The radiation of beam 238 is reflected by the target, and returns to apparatus s 200 as a beam 242. Similarly to the beams originating from VCSEL 222*a* hereinabove, local beam 240 is coupled out of waveguide 212 into a beam 244. Beam 242 is transmitted through the waveguide, and both beam 242 and beam 244 impinge on photodiode 224 and interfere optically. The optical interference signal is, as detailed hereinabove, utilized to find the range of the location on the target where beam 238 impinged.

Figure 4:
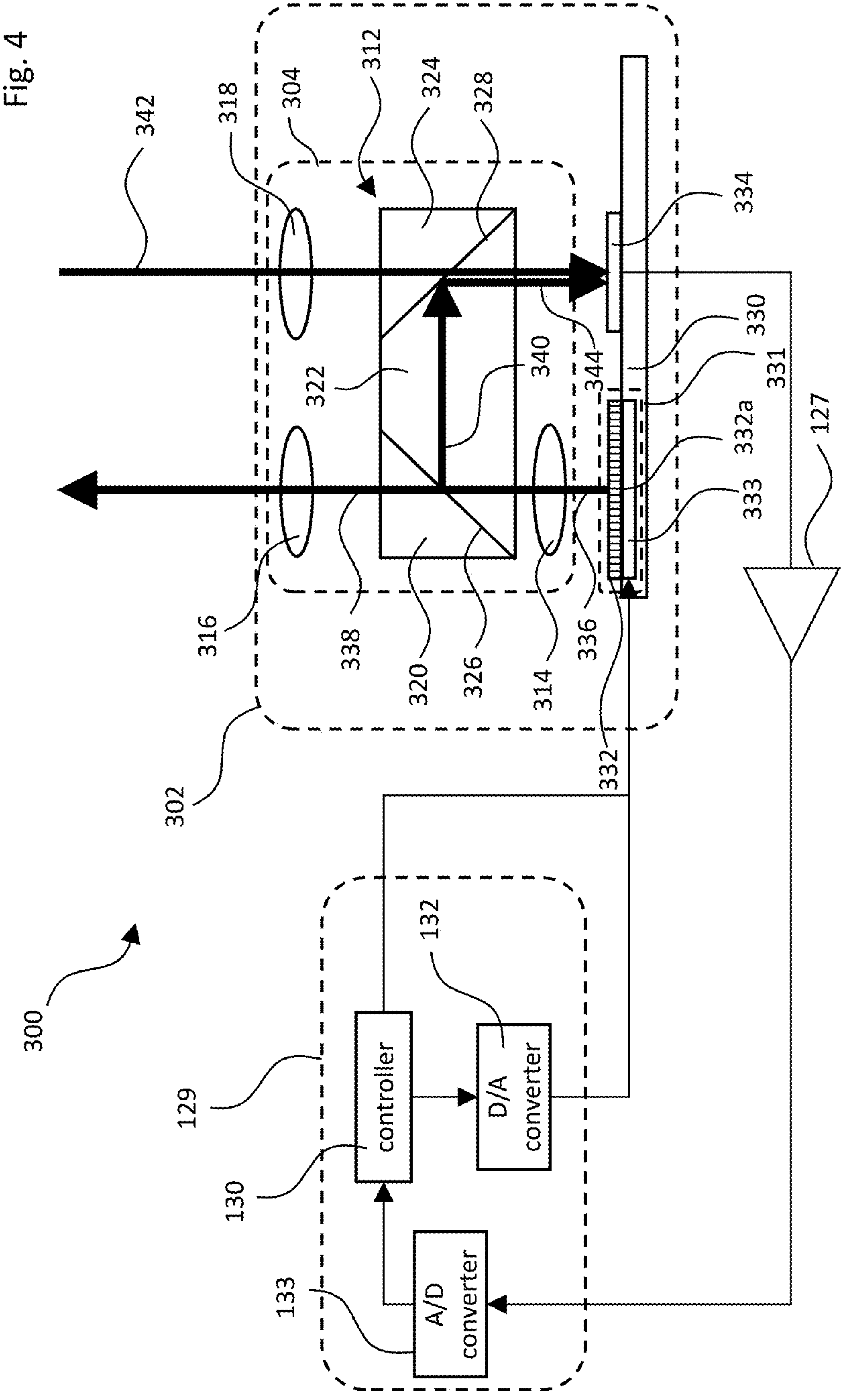

FIG. 4 is a schematic sectional view of a range sensing apparatus 300, in accordance with another embodiment of the invention. Apparatus 300 uses a less cumbersome beam-splitting arrangement than the preceding embodiments, but in a bistatic configuration that may be susceptible to inaccuracy at short range due to parallax.

Apparatus 300 comprises an optoelectronic assembly 302 and electronic assembly 129. Optoelectronic assembly 302 comprises an optical assembly 304, which comprises a monolithic prism assembly 312, a collimating lens 314, a projection lens 316, and a collection lens 318. Prism assembly 312 comprises prisms 320, 322, and 324, with neutral (non-polarizing) beamsplitters 326 and 328 disposed between prisms 320 and 322 and between prisms 322 and 324, respectively. Both beamsplitters 326 and 328 typically transmit most of the impinged radiation and reflect a smaller fraction.

Optoelectronic assembly 302 further comprises a silicon substrate 330, on which a transmitter 331, comprising a two-dimensional VCSEL array 332 and switching circuitry 333, and a photodiode 334 are disposed.

For finding the range of a location on a target (not shown in this figure), electronic assembly 129 drives the VCSELs to emit sequentially beams of coherent optical radiation. As an example, a VCSEL 332*a* emits a beam 336, which is collimated by collimating lens 314 and projected toward prism assembly 312, where it is split by beamsplitter 326 into a beam 338 and into a local beam 340. Beam 338 is projected by projection lens 316 onto a location on the target. A portion of the radiation reflected by the location on the target impinges as a beam 342 on collection lens 318 and is projected by the lens toward prism assembly 312, where it passes through beamsplitter 328 onto photodiode 334. Local beam 340 is reflected by beamsplitter 328 onto photodiode 334, where it interferes optically with beam 342. Photodiode 334 converts the optical interference signal into an analog electrical beat signal, which is coupled via amplifier 127 to electrical assembly 129 for finding the range of the location on the target.

Figure 5:
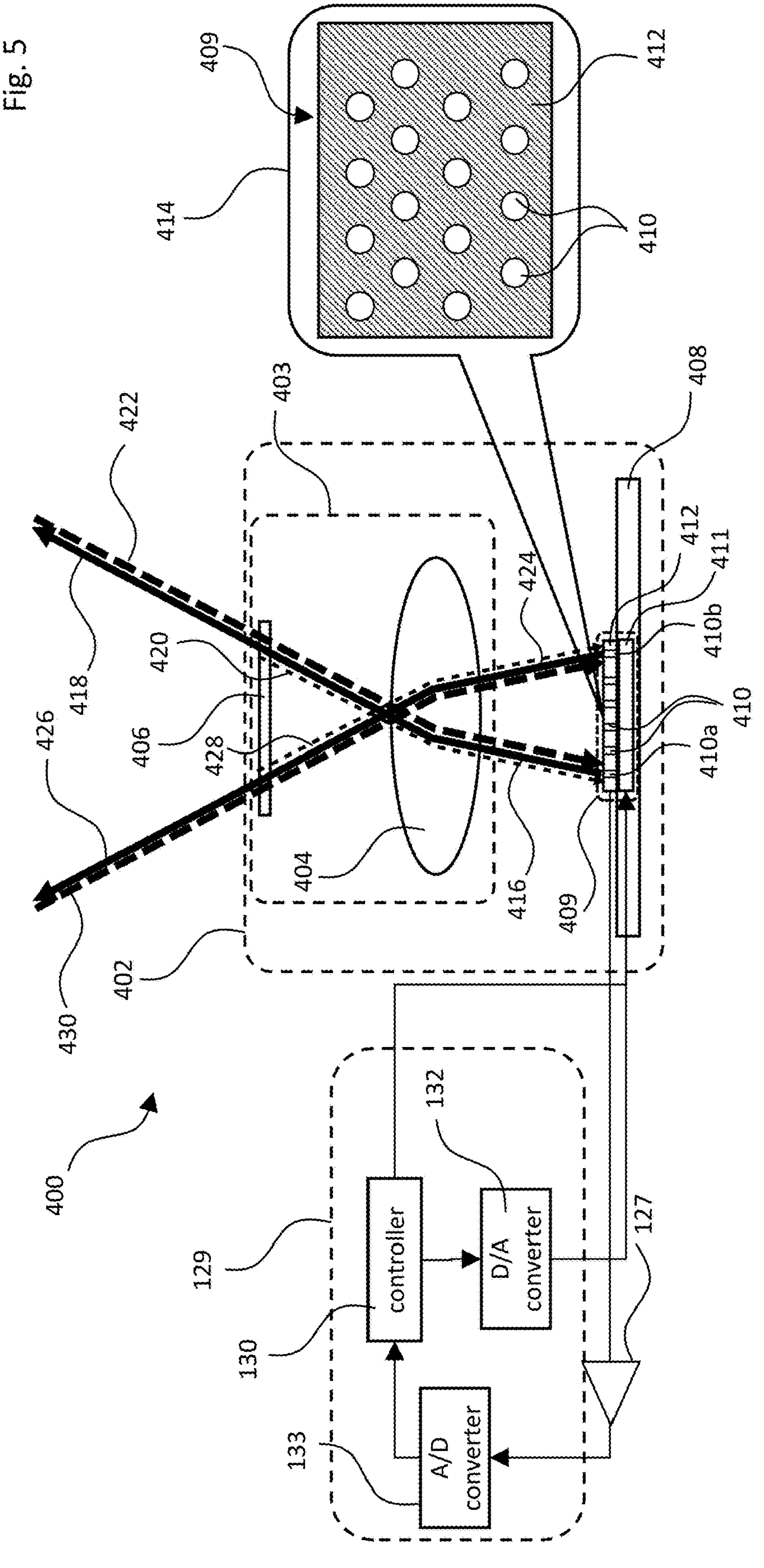

FIG. 5 is a schematic sectional view of a range sensing apparatus 400, in accordance with another embodiment of the invention.

Apparatus 400 comprises an optoelectronic assembly 402 and electronic assembly 129. Optoelectronic assembly 402 comprises an optical assembly 403, comprising a collimating lens 404 and a partial retroreflector 406.

Optoelectronic assembly 402 further comprises a silicon substrate 408, with a transmitter-detector assembly 409 disposed on the substrate. Transmitter-detector assembly 409 comprises a sparse array of VCSELs 410, a photodiode 412, and switching circuitry 411. Transmitter-detector assembly 409 is shown in a frontal view in an inset 414. The VCSELs of VCSEL array 410 are interleaved on substrate 408 with photodiode 412 so that a portion of photodiode 412 is visible around and behind each VCSEL.

For finding the range of a location on a target (not shown in this figure), electronic assembly 129 drives the VCSELs to emit sequentially beams of coherent optical radiation. As an example, a VCSEL 410*a* emits a beam 416, which is collimated by collimating lens 404 and projected onto partial retroreflector 406. Partial retroreflector 406 splits beam 416 into a beam 418, which is projected toward the location on the target, and a local beam 420, which returns through collimating lens 404 onto photodiode 412.

A portion of beam 418 that is reflected by the target returns to apparatus 400 as a beam 422, which is projected by collimating lens 404 onto photodiode 412, where it optically interferes with local beam 420, producing an optical interference signal. This signal is converted by photodiode 412 into an analog electrical beat signal, which is coupled via amplifier 127 to electronic assembly 129, where controller 130 analyzes the signal to find the range of the location on the target.

In an alternative embodiment, rather than utilizing beam 420 reflected by partial retroreflector 406 as a local beam, backscattered light from VCSEL 410*a* may be used as a local beam for interfering with beam 422 on photodiode 412.

For finding the range of another location on the target, electronic assembly 129 drives another VCSEL, for example VCSEL 410*b*, to emit a beam 424. Similarly to beam 416 emitted by VCSEL 410*a*, beam 424 splits at partial retroreflector 406 into a beam 426, projected toward the other location on the target, and a local beam 428. A portion of beam 426 is reflected back to apparatus 400 as a beam 430. Beams 428 and 430 impinge on photodiode 412 and interfere optically, producing an optical interference signal. The optical interference signal is converted by photodiode 412 into an analog electrical beat signal and coupled to electronic assembly 129 for finding the range of the other location on the target.

In an alternative embodiment, single photodiode 412 may be replaced by an array of photodiodes interleaved with the VCSELs of VCSEL array 410 or even underneath VCSEL array 410.

Figure 6:
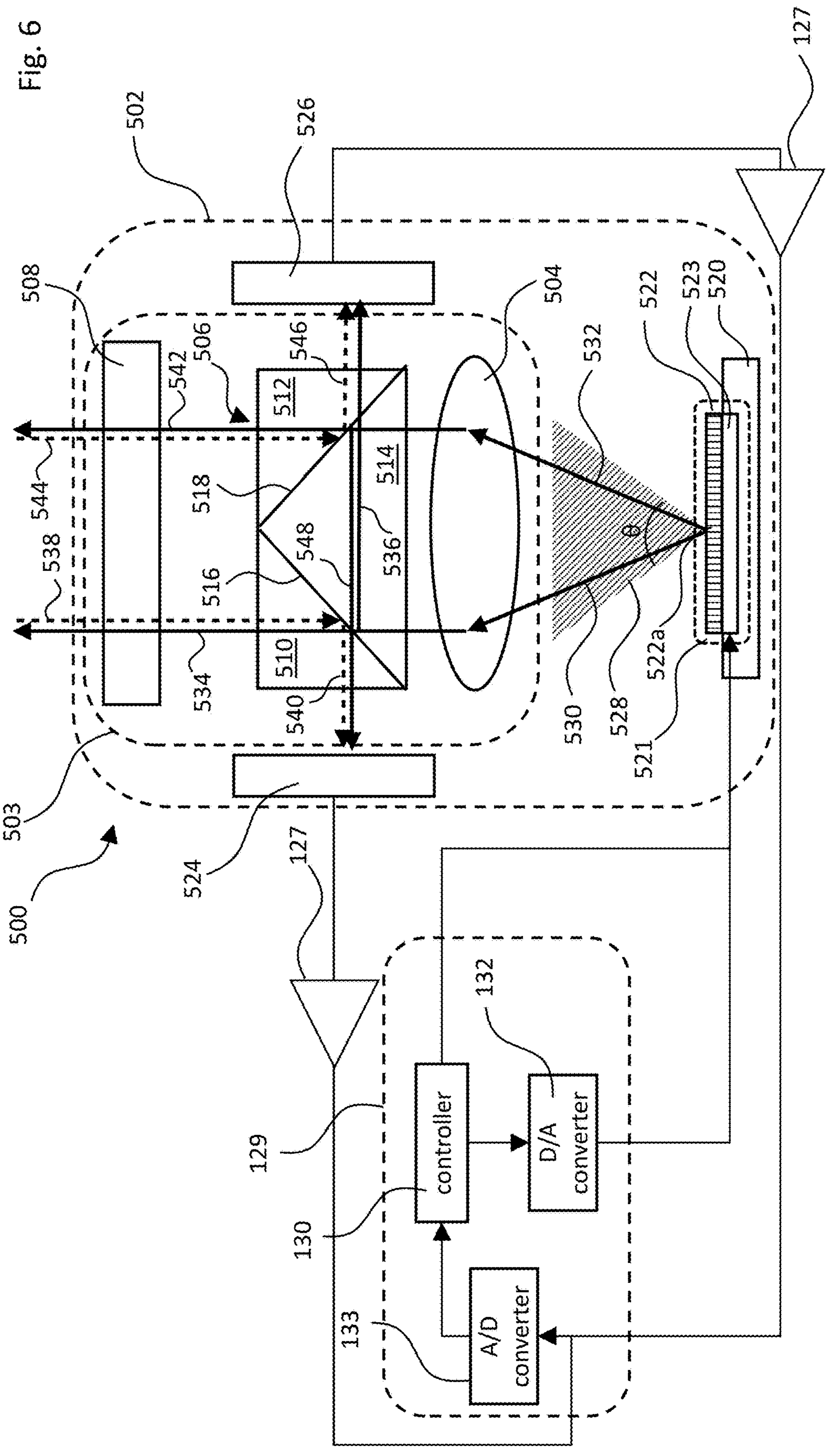

FIG. 6 is a schematic sectional view of a range sensing apparatus 500, in accordance with another embodiment of the invention.

Apparatus 500 comprises an optoelectronic assembly 502 and electronic assembly 129. Optoelectronic assembly 502 comprises an optical assembly 503, comprising a collimating lens 504, a monolithic prism assembly 506, and a quarter-wave plate 508. Prism assembly 506 comprises prisms 510, 512, and 514, with semi-polarizing beamsplitters 516 and 518 disposed between prisms 510 and 514 and between prisms 512 and 514, respectively. Beamsplitters 516 and 518 have transmittances and reflectances as shown in Table 1 hereinbelow, although alternatively, other ratios of transmittance and reflectance may be used, particularly for the TM polarization.

TABLE 1

REFLECTANCE R AND TRANSMITTANCE T FOR BEAMSPLITTERS 516 AND 518

| Polarization | R (%) | T (%) |
|---|---|---|
| TE | 0 | 100 |
| TM | 50 | 50 |

Optoelectronic assembly 502 also comprises a silicon substrate 520, on which a transmitter 521, comprising a two-dimensional VCSEL array 522 and switching circuitry 523 is disposed. Optoelectronic assembly 502 further comprises two photodiodes 524 and 526.

For finding the range of a location on a target (not shown in this figure), electronic assembly 129 drives the VCSELs of array 522 to emit sequentially beams of coherent optical radiation. As an example, a VCSEL 522*a* emits a diverging beam 528 of optical radiation into an angle θ, which is collimated by collimating lens 504. For the sake of clarity, the emitted beam is represented by discrete beams 530 and 532, wherein beam 530 represents those beams impinging on beamsplitter 516 and beam 532 represents the beams impinging on beamsplitter 518. The VCSELs of VCSEL array 522 have been oriented so as to have 90% of the intensity of their radiation in TE polarization and 10% in TM polarization.

Beam 530 impinges on beamsplitter 516, which transmits 100% of its TE component into a beam 534 and reflects 50% of its TM component into a local beam 536. Beam 534 is transmitted through quarter-wave plate 508 and projected toward the location on the target. A portion of beam 534 that is reflected by the target returns to apparatus 500 as a beam 538 and is transmitted through quarter-wave plate 508. Due to the double-pass through quarter-wave plate 508, the polarization of beam 538 is rotated to be in the TM direction, and 50% of beam 538 is reflected by beamsplitter 516 as a beam 540 to photodiode 524. Local beam 536 is transmitted by beamsplitter 518 (with a 50% reduction in intensity) to photodiode 526.

Beam 532 travels a path symmetrical to that of beam 530, resulting in a beam 542 projected to the same location on the target as beam 534, returning as a beam 544, and impinging on photodiode 526 as a beam 546 (with a 50% reduction in intensity). A local beam 548 impinges on photodiode 524.

Beams 540 and 548 interfere optically on photodiode 524, which converts the optical interference signal into an analog electrical beat signal. Similarly, beams 546 and 536 interfere optically on photodiode 526, resulting in an analog electrical beat signal. The two electrical signals from photodiodes 524 and 526 are coupled via amplifiers 127 to electronic assembly 129, where controller 130 analyzes them to find the range of the location on the target.

Figure 7:
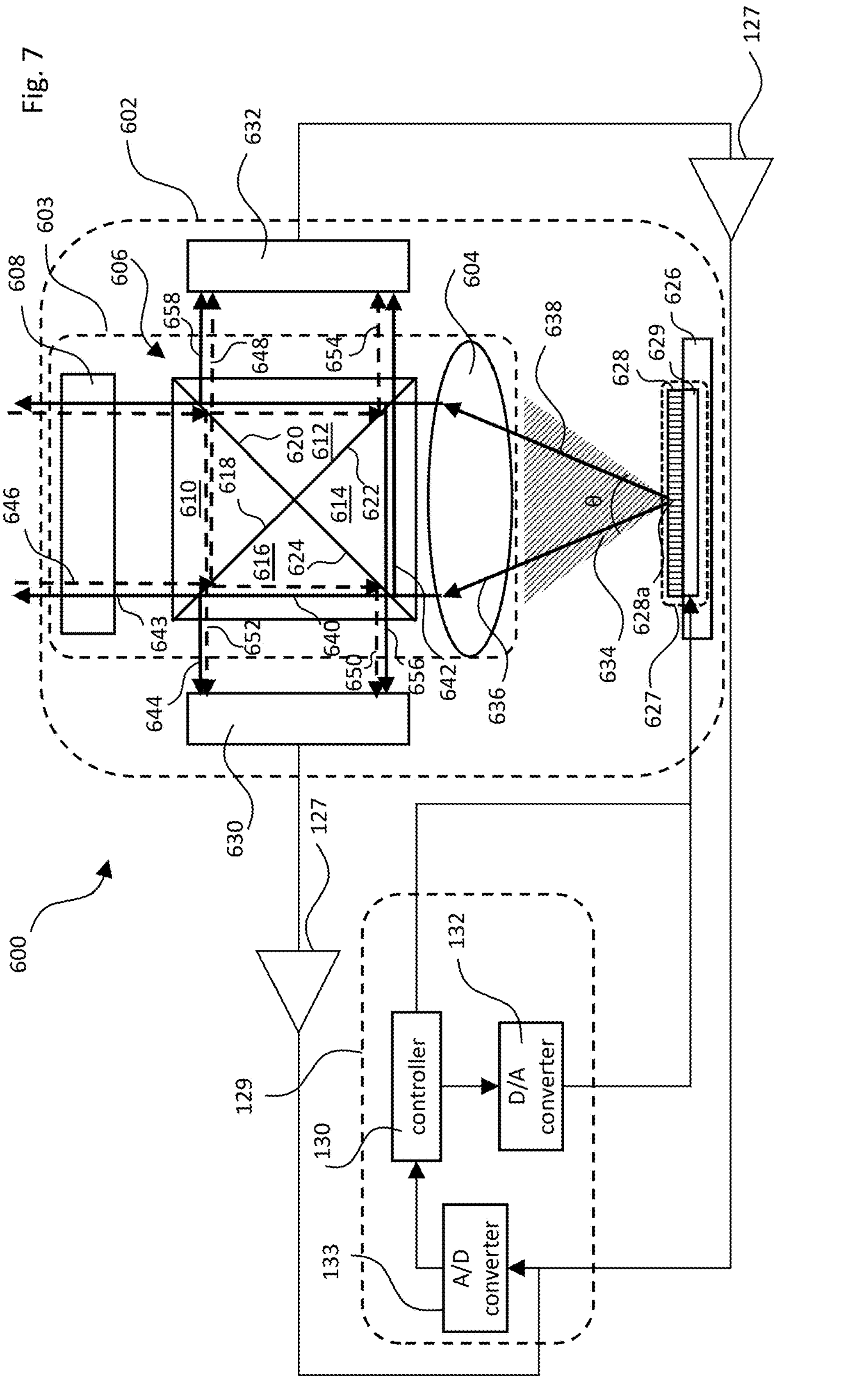

FIG. 7 is a schematic sectional view of a range sensing apparatus 600, in accordance with another embodiment of the invention. This embodiment operates on principles similar to apparatus 500 (FIG. 6), but with reduced optical losses.

Apparatus 600 comprises an optoelectronic assembly 602 and electronic assembly 129. Optoelectronic assembly 602 comprises an optical assembly 603, comprising a collimating lens 604, a monolithic prism assembly 606 in the form of an X-cube, and a quarter-wave plate 608. Prism assembly 606 comprises prisms 610, 612, 614, and 616, with semi-polarizing beamsplitters 618, 620, 622, and 624 disposed between the adjacent prisms. Beamsplitters 618, 620, 622, and 624 have the same transmittances and reflectances as beamsplitters 516 and 518 (FIG. 6, Table 1).

Optoelectronic assembly 602 also comprises a silicon substrate 626, on which a transmitter 627 is disposed, comprising a two-dimensional VCSEL array 628 and switching circuitry 629. Optoelectronic assembly 602 further comprises two photodiodes 630 and 632.

For finding the range of a location on a target (not shown in this figure), electronic assembly 129 drives the VCSELs to emit sequentially beams of coherent optical radiation. As an example, a VCSEL 628*a* emits a diverging beam 634 of optical radiation into an angle θ, which is collimated by collimating lens 604. For the sake of clarity, emitted beam 634 is represented by two discrete beams 636 and 638. The VCSELs of VCSEL array 628 have been oriented so as to have 90% of the intensity of their radiation in TE polarization and 10% in TM polarization.

Beam 636 impinges on beamsplitter 624, which transmits 100% of its TE component and 50% of its TM component into a beam 640, and reflects 50% of its TM component into a local beam 642. Beam 640 impinges on beamsplitter 618, which transmits 100% of its TE component into a beam 643 and reflects 50% of the remaining TM component into a local beam 644. Beam 642 is transmitted through quarter-wave plate 608 and projected toward the location on the target. A portion of beam 643 that is reflected by the target is captured by apparatus 600 as a beam 646, which, after passing through quarter-wave plate 608, is TM polarized. It impinges on the two beamsplitters 618 and 624, which each reflect 50% of the impinging beam onto photodiodes 632 and 630 as beams 648 and 650, respectively, with an additional reflection loss for beam 648 at beamsplitter 620. Local beams 642 and 644 impinge on photodiodes 632 and 630, respectively, with an additional reflection loss for local beam 642 at beamsplitter 622.

Beam 638 travels a path symmetrical to that of beam 636. For the sake of clarity, only the beams impinging on photodiodes 630 and 632 have been labelled: From the location on the target, a beam 652 impinges on photodiode 630 and a beam 654 impinges on photodiode 632. A local beam 656 impinges on photodiode 630 and a local beam 658 impinges on photodiode 632. On photodiode 630, beams 650 and 652 reflected by the target and local beams 644 and 656 interfere optically. Similarly, on photodiode 632, beams 648 and 654 reflected by the target and local beams 642 and 658 interfere optically. (Although FIG. 7 shows the paths of two discrete beams 636 and 638, in reality the continuum of emitted beams in diverging beam 634 produces a continuum of both the beams reflected by the target and the local beams.) Photodiodes 630 and 632 convert the detected optical interference signals into analog electrical beat signals, which are coupled via amplifiers 127 to electronic assembly 129 for finding the range of the location on the target.

Figure 8:
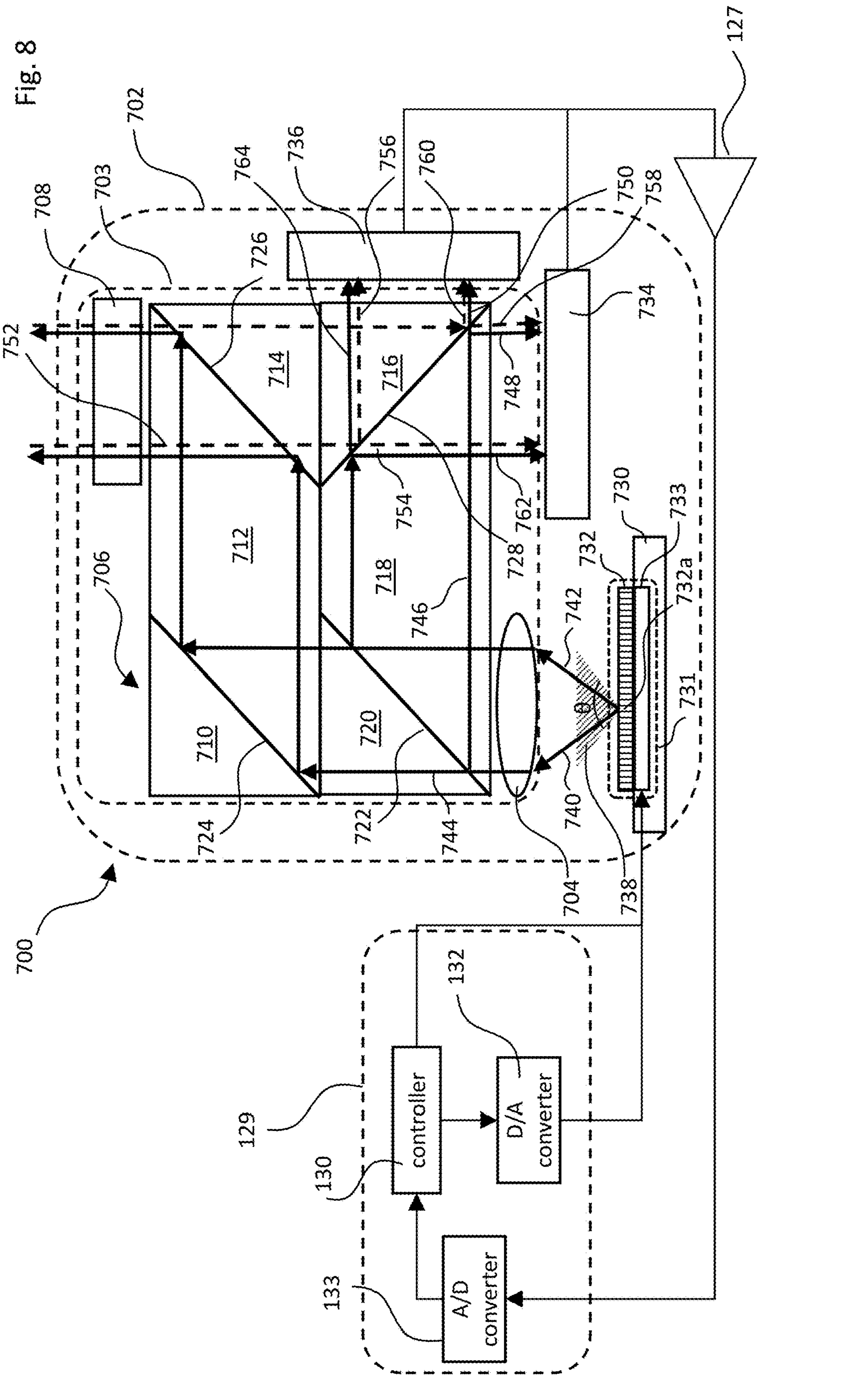

FIG. 8 is a schematic sectional view of a range sensing apparatus 700, in accordance with another embodiment of the invention.

Apparatus 700 comprises an optoelectronic assembly 702 and electronic assembly 129. Optoelectronic assembly 702 comprises an optical assembly 703, comprising a collimating lens 704, a monolithic prism assembly 706, and a quarter-wave plate 708. Prism assembly 706 comprises prisms 710, 712, 714, 716, 718, and 720. Beamsplitters and reflectors are disposed between the prisms as detailed in Table 2 hereinbelow.

TABLE 2

BEAMSPLITTERS AND REFLECTORS

| Label | Type | Between prisms | | Polarization | R (%) | T (%) |
|---|---|---|---|---|---|---|
| 722 | polarizing beamsplitter | 718 | 720 | TE<br>TM | 0<br>100 | 100<br>0 |
| 724 | reflector | 710 | 712 | all | 100 | 0 |
| 726 | polarizing beamsplitter | 712 | 714 | TE<br>TM | 100<br>0 | 0<br>100 |
| 728 | neutral beamsplitter | 716 | 718 | all | 50 | 50 |

Optoelectronic assembly 702 also comprises a silicon substrate 730, on which is disposed a transmitter 731, comprising a two-dimensional VCSEL array 732 and switching circuitry 733. Optoelectronic assembly 702 further comprises two photodiodes 734 and 736 in a balanced configuration.

For finding the range of a location on a target (not shown in this figure), electronic assembly 129 drives the VCSELs of array 732 to emit sequentially beams of coherent optical radiation. As an example, a VCSEL 732*a* emits a diverging beam 738 of optical radiation into an angle θ, which is collimated by collimating lens 704. For the sake of clarity, emitted beam 738 is represented by two discrete beams 740 and 742.

Beam 740 impinges on polarizing beamsplitter 722, which divides the beam into a TE polarized transmitted beam 744 and a reflected TM polarized local beam 746. Beam 744 is reflected by reflector 724 and by polarizing beamsplitter 726, and projected through quarter-wave plate 708 toward the location on the target. Local beam 746 is split by neutral beamsplitter 728 into local beams 748 and 750, which impinge on photodiodes 734 and 736, respectively. A portion of beam 744 that is reflected by the target is captured by apparatus 700 as a beam 752. After passing through quarter-wave plate 708, beam 752 is TM polarized, and it passes through polarizing beamsplitter 726 and is split into beams 754 and 756 by neutral beamsplitter 728. Beams 754 and 756 impinge on photodiodes 734 and 736, respectively. Beam 742 travels a path symmetrical to that of beam 740.

As in FIG. 7, for the sake of clarity, only the beams impinging on photodiodes 734 and 736 have been labelled: From the location on the target, a beam 758 impinges on photodiode 734 and a beam 760 impinges on photodiode 736. A local beam 762 impinges on photodiode 734 and a local beam 764 impinges on photodiode 736. On photodiode 734, beams 754 and 758 reflected by the target and local beams 748 and 762 interfere optically. Similarly, on photodiode 736, beams 756 and 760 reflected by the target and local beams 750 and 764 interfere optically. (As in FIG. 7, although only two discrete beams 740 and 742 are shown in FIG. 8, the continuum of emitted beams in diverging beam 738 actually produces a continuum of both beams reflected by the target and local beams.) Photodiodes 734 and 736 convert the detected optical interference signals into analog electrical beat signals. As in FIG. 2, the photodiodes in this example are configured as a balanced pair, stacked anode-to-cathode and outputting a difference signal to transimpedance amplifier 127, whose output is coupled to electronic assembly 129 for finding the range of the location on the target.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Range sensing apparatus, comprising:
   a transmitter comprising an array of emitters configured to emit respective beams of coherent optical radiation and switching circuitry coupled to the emitters;
   an optical detector;
   an optical assembly, which is configured to divide each beam of the coherent optical radiation into a transmitted beam and a local beam, to project the local beam toward the optical detector, to project the transmitted beam toward a respective location on a target, and to direct optical radiation reflected from the respective location onto the optical detector so as to interfere optically with the local beam; and
   a controller coupled to apply amplitude-chirped electrical drive pulses to the transmitter while controlling the switching circuitry to temporally multiplex the electrical drive pulses among the emitters, and to receive and process electrical beat signals output by the optical detector in response to interference between the reflected optical radiation and the local beam.

2. The apparatus according to claim 1, wherein the array of emitters and the switching circuitry are disposed on a single integrated circuit.

3. The apparatus according to claim 1, and comprising an array of lenslets disposed on the array of emitters, wherein each lenslet is aligned with a respective emitter.

4. The apparatus according to claim 1, wherein the emitters comprise vertical-cavity surface-emitting lasers (VCSELs).

5. The apparatus according to claim 1, and comprising an digital-analog converter configured to generate the electrical drive pulses in response to a digital input from the controller, and wherein the controller is configured to vary the digital input during each of the drive pulses so as to linearize a frequency chirp of the beams of optical radiation.

6. The apparatus according to claim 1, wherein the optical detector comprises a balanced pair of photodiodes.

7. The apparatus according to claim 1, wherein the optical detector comprises a single detector, and the optical assembly is configured to direct the optical radiation reflected from the respective beams of all the emitters in the array onto the single detector.

8. The apparatus according to claim 1, wherein the optical detector comprises an array of detectors.

9. The apparatus according to claim 1, wherein the controller is configured to analyze the beat signals to find a range of the respective location on the target.

10. The apparatus according to claim 1, wherein the optical assembly comprises a polarizing beamsplitter cube, which is configured to divide each beam of the coherent optical radiation into the transmitted beam and the local beam, and one or more polarization rotators.

11. The apparatus according to claim 10, wherein the polarizing beamsplitter cube comprises an X-cube.

12. The apparatus according to claim 1, wherein the optical assembly comprises a monolithic assembly of prisms.

13. The apparatus according to claim 12, wherein the optical detector comprises first and second photodiodes positioned on different, first and second sides of the monolithic assembly of prisms and configured to receive respective first and second parts of the reflected optical radiation and of the local beam.

14. The apparatus according to claim 1, wherein the optical assembly comprises an optical waveguide comprising input and output couplers, wherein the transmitted beam and the reflected radiation pass through the waveguide to and from the target, while the local beam is guided within the waveguide between the input and output couplers from the transmitter to the optical detector.

15. The apparatus according to claim 1, wherein the emitters are interleaved with the optical detector on a common substrate.

16. The apparatus according to claim 1, wherein the emitters are disposed over the optical detector.

17. A method for range sensing, comprising:
   providing a transmitter comprising an array of emitters configured to emit respective beams of coherent optical radiation;
   applying amplitude-chirped electrical drive pulses to the transmitter while temporally multiplexing the electrical drive pulses among the emitters so that the emitters emit the respective beams sequentially;
   dividing each beam of the coherent optical radiation into a transmitted beam and a local beam;
   projecting the local beam toward an optical detector, while projecting the transmitted beam toward a respective location on a target;
   directing optical radiation reflected from the respective location onto the optical detector so as to interfere optically with the local beam; and
   receiving and processing electrical beat signals output by the optical detector in response to interference between the reflected optical radiation and the local beam.

18. The method according to claim 17, wherein applying the amplitude-chirped electrical drive pulses to the transmitter comprises varying a shape of the drive pulses so as to linearize a frequency chirp of the beams of optical radiation.

19. The method according to claim 17, wherein projecting the local beam comprises projecting the local beam toward a single detector and wherein directing the optical radiation comprises directing the reflected optical radiation onto the single optical detector.

20. The method according to claim 17, wherein processing the electrical beat signals comprises analyzing the beat signals to find a range of the respective location on the target.

* * * * *